No. 821,110. PATENTED MAY 22, 1906.
A. MEHLHORN & P. VON KLITZING.
FLOATING DOCK.
APPLICATION FILED JULY 30, 1904.
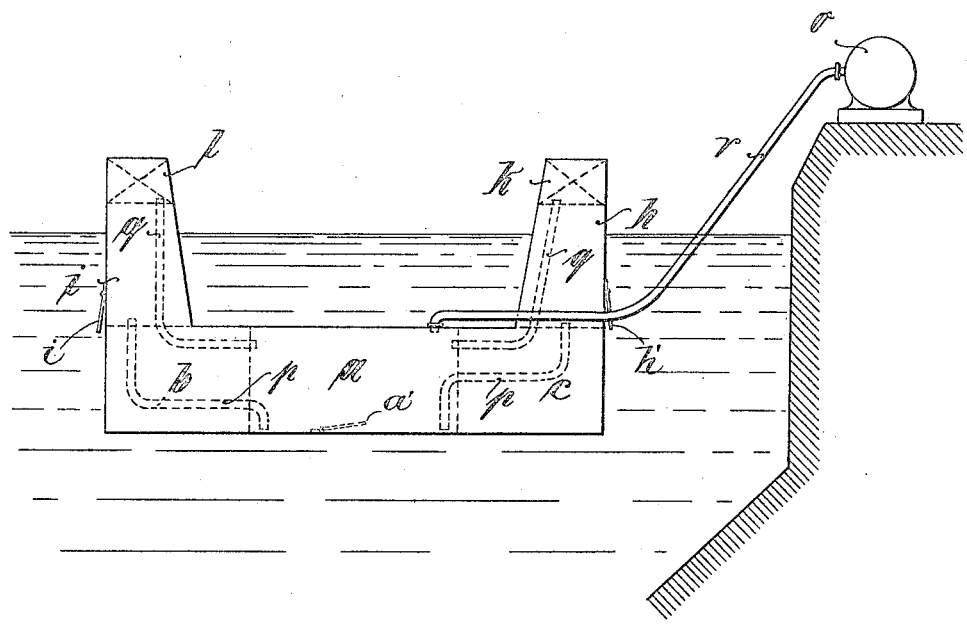
Witnesses:
Inventors:
Alfred Mehlhorn,
Philipp von Klitzing,
By　　　　　　
　　attorney.

UNITED STATES PATENT OFFICE.

ALFRED MEHLHORN, OF DIETRICHSDORF, NEAR KIEL, AND PHILIPP VON KLITZING, OF NEUMÜHLEN, NEAR KIEL, GERMANY.

FLOATING DOCK.

No. 821,110.     Specification of Letters Patent.     Patented May 22, 1906.

Application filed July 30, 1904. Serial No. 218,785.

*To all whom it may concern:*

Be it known that we, ALFRED MEHLHORN, of Dietrichsdorf, near Kiel, and PHILIPP VON KLITZING, of Neumühlen, near Kiel, Germany, have invented certain new and useful Improvements in Floating Docks, of which the following is a specification.

The present invention relates to a floating dock provided with a number of internal chambers into which water is allowed to enter through openings or valves when the dock is sunk, so that the air present in such chambers is compressed. When the dock is raised, the water which has entered the chambers in sinking the dock is automatically expelled. By this arrangement we obtain considerable saving of pumping work and also in the cost of installation, as owing to the power necessary to raise the dock being stored up while sinking the same the height to which and the quantity of water to be pumped is much reduced and by partially neutralizing the water-pressure and by lifting the ship at the point of support thereof the maximum strain in the iron structure and exterior wall is considerably reduced.

In the same proportion as when sinking a loaded dock the weight is gradually decreased, while it is increased in raising the dock. The weight of the dock is increased or decreased by filling and emptying reserve tanks provided in the side chambers. This is done in such a way that the weight of the dock remains the same whether a ship is in it or not—that is, when no ship is in the dock a corresponding weight of water is raised.

The air-chambers are so arranged as regards their position and size that in the same way on sinking the dock the weight of the load is decreased. The buoyancy, owing to the compression of the air, is decreased, and in the opposite case increased, so that the load is balanced, and for raising and sinking the dock only the frictional resistances have to be overcome and such losses of power as may occur to be replaced.

In the accompanying drawing, which forms a part of this specification and which shows a sectional view of our improved dock, $h$ $i$ designate the reserve water-tanks, and $k$ $l$ designate air-reservoirs in the top side chambers. The air-reservoirs $k$ $l$ are connected with the compartments $a$ by a pipe $q$, and the reserve tanks $h$ $i$ are connected with the compartments $a$ by pipes $p$, so that in order to balance the weight water can be let into and out of said reserve tanks.

The reference-letters $a'$, $i'$, and $h'$ designate automatic valves for regulating the flow of water.

The tanks only need to be filled when first sinking the dock and then remain filled when raising said dock unloaded. The water let out when raising the dock, together with a ship, in order to balance the weight is let in again on sinking the dock a second time. For the purpose of sinking the dock deeper than automatically possible the chambers must be filled above the external water-level, and the air in the chambers $a$ being in this way further compressed the water is automatically emptied on raising the dock. In large docks a compressing plant which can also be used for working tools may be provided with advantage, as on raising the dock small quantities of air must be fed to the compressed air, and the production of a small excess pressure suffices in order to press out the water.

The effect obtained by automatically compressing the air is essentially increased by enlarging the volume of air. The size of the air-chambers used for the compression is, however, restricted by the condition for sinking the dock—namely, that when the dock is sunk the air-chambers underneath the water must not be greater than the displacement of the weight of the dock less the material water displacement. In order nevertheless to obtain the desired effect the air in sinking the dock is passed out of the correspondingly-enlarged air-chamber into other chambers, which, as there is not sufficient space in the dock above the water-level, are provided outside the dock—for example, on land, as shown in the drawing. Said chambers can, however, also be arranged to float on the water. In the drawing, $o$ is the exterior chamber, and $r$ the pipe connecting said chamber with the chamber $a$ of the dock. By this means the advantage is obtained that in spite of the increased size of the internal air-chambers they are decreased to the required extent in sinking the dock, while in raising the dock said chambers are automatically so enlarged that the larger portion of the ship's weight is automatically balanced, so that it is only necessary to pump out small quantities of water in order to raise the dock again, the water automatically flowing out of the remaining chambers. In larger docks it is preferable to use an air-compressing plant of the pumping plant, as a comparatively small quantity of compressed air supplied to that compressed in the internal chambers in sinking the dock would suffice to press the water out of the same. The air chambers in the bottom pontoon can then be extended over the entire width of the pontoon and the water be pressed out of these chambers, while it would automatically flow out of the top side chambers. In order to facilitate sinking the unloaded dock, a corresponding quantity of water is left in the side pontoons $h$ and $i$ or pumped into the same for the purpose.

What we claim, and desire to secure by Letters Patent, is—

1. A floating dock, comprising in combination, chambers in the bottom pontoon of said dock, means connecting the bottom of said chambers with the exterior water, side air-chambers in said dock, and means connecting the chambers in said bottom pontoon with said side chambers, substantially as, and for the purpose set forth.

2. A floating dock, comprising in combination, chambers in the bottom pontoon of said dock, means connecting the bottom of said chambers with the exterior water, side air-chambers in said dock, side water-chambers in said dock, means connecting the chambers in said bottom pontoon with said side air-chambers and means connecting said side water-chambers with the bottom part of the chambers in said bottom pontoon, substantially as; and for the purpose set forth.

3. A floating dock, comprising in combination, chambers in the bottom pontoon of said dock, means connecting the bottom of said chamber with the exterior water, side air-chambers in said dock, means connecting the chambers in said bottom pontoon with said side chambers, an air-chamber outside said dock, and means connecting said outside air-chamber with the chambers in said bottom pontoon, substantially as, and for the purpose set forth.

In testimony that we claim the foregoing as our invention we have signed our names in presence of two subscribing witnesses.

ALFRED MEHLHORN.
PHILIPP VON KLITZING.

Witnesses:
OTTO STEINITZ,
WILHELM DECTJEN.